United States Patent
Itoh et al.

(10) Patent No.: US 10,987,654 B2
(45) Date of Patent: Apr. 27, 2021

(54) CERIA-ZIRCONIA-BASED COMPOSITE OXIDE OXYGEN STORAGE MATERIAL, EXHAUST GAS CLEANING CATALYST, AND HONEYCOMB STRUCTURE FOR EXHAUST GAS CLEANING

(71) Applicant: NIPPON DENKO CO., LTD., Tokyo (JP)

(72) Inventors: Tomoharu Itoh, Anan (JP); Yusuke Hidaka, Anan (JP); Masasuke Yamaba, Anan (JP); Kenji Okamoto, Anan (JP); Hiroki Uede, Anan (JP)

(73) Assignee: NIPPON DENKO CO., LTD, Tokyo (JP)

( * ) Notice: Subject to any disclaimer, the term of this patent is extended or adjusted under 35 U.S.C. 154(b) by 0 days.

(21) Appl. No.: 16/072,624

(22) PCT Filed: Jan. 23, 2017

(86) PCT No.: PCT/JP2017/002183
§ 371 (c)(1),
(2) Date: Jul. 25, 2018

(87) PCT Pub. No.: WO2017/130917
PCT Pub. Date: Aug. 3, 2017

(65) Prior Publication Data
US 2019/0039049 A1 Feb. 7, 2019

(30) Foreign Application Priority Data

Jan. 26, 2016 (JP) .............................. JP2016-012882
Aug. 8, 2016 (JP) .............................. JP2016-155298

(51) Int. Cl.
| | |
|---|---|
| *B01J 23/10* | (2006.01) |
| *B01J 35/04* | (2006.01) |
| *F01N 3/10* | (2006.01) |
| *B01J 23/63* | (2006.01) |
| *C01G 25/02* | (2006.01) |
| *B01D 53/94* | (2006.01) |
| *B01J 21/06* | (2006.01) |

(52) U.S. Cl.
CPC ............ *B01J 23/10* (2013.01); *B01D 53/945* (2013.01); *B01J 21/066* (2013.01); *B01J 23/63* (2013.01); *B01J 35/04* (2013.01); *C01G 25/02* (2013.01); *F01N 3/10* (2013.01); *B01D 2255/206* (2013.01); *B01D 2255/407* (2013.01); *B01D 2255/908* (2013.01); *B01D 2258/014* (2013.01); *B01J 2523/3712* (2013.01); *B01J 2523/48* (2013.01)

(58) Field of Classification Search
CPC .......... B01J 23/10; B01J 21/066; B01J 35/04; B01D 53/94; C01G 25/02; F01N 3/10
See application file for complete search history.

(56) References Cited

U.S. PATENT DOCUMENTS

| 6,228,799 B1 | 5/2001 | Aubert et al. |
|---|---|---|
| 2001/0046941 A1 | 11/2001 | Mussmann et al. |
| 2006/0263284 A1 | 11/2006 | Larcher et al. |
| 2007/0099298 A1 | 5/2007 | Suzuki |
| 2009/0170689 A1 | 7/2009 | Hatanaka et al. |
| 2009/0274599 A1 | 11/2009 | Larcher et al. |
| 2010/0040523 A1 | 2/2010 | Larcher et al. |
| 2013/0143732 A1 | 6/2013 | Aoki |
| 2014/0037524 A1 | 2/2014 | Mikita et al. |
| 2016/0121302 A1 | 5/2016 | Morikawa et al. |
| 2016/0207027 A1 | 7/2016 | Kodama |

FOREIGN PATENT DOCUMENTS

| DE | 501 06 490 T2 | 3/2006 |
|---|---|---|
| JP | 2004-68717 A | 3/2004 |
| JP | 2005-119949 A | 5/2005 |
| JP | 2006-516524 A | 7/2006 |
| JP | 2006-256912 A | 9/2006 |
| JP | 2011-121851 A | 6/2011 |
| JP | WO2012/105454 A1 | 7/2014 |
| JP | 2015-112553 A | 6/2015 |
| JP | 2015-112555 A | 6/2015 |
| JP | 2015-131892 A | 7/2015 |
| JP | 2016-112489 A | 6/2016 |
| JP | 2016-112491 A | 6/2016 |
| JP | 2016-112492 A | 6/2016 |
| WO | WO 2014/199219 A1 | 12/2014 |
| WO | WO 2015/145787 A1 | 10/2015 |
| WO | WO 2016/092860 A1 | 6/2016 |
| WO | WO 2016/092862 A1 | 6/2016 |
| WO | WO 2016/092863 A1 | 6/2016 |

OTHER PUBLICATIONS

International Search Report for PCT/JP2017/002183 dated Mar. 7, 2017.
Extended European Search Report dated Aug. 29, 2019, for corresponding European Patent Application No. 17744147.4.
European Office Action for corresponding European Application No. 17744147.4, dated Nov. 18, 2020.

*Primary Examiner* — James A Fiorito
(74) *Attorney, Agent, or Firm* — Birch, Stewart, Kolasch & Birch, LLP

(57) ABSTRACT

A ceria-zirconia-based composite oxide oxygen storage material with a fast oxygen storage rate having an OSC ability enabling fast response to changes in exhaust gas which does not greatly fluctuate in composition, but varies at a fast rate near the stoichiometric air-fuel ratio, an exhaust gas purification catalyst, and a honeycomb structure for exhaust gas purification are provided. A ceria-zirconia-based composite oxide oxygen storage material, which oxygen storage material has a molar ratio of cerium and zirconium, by cerium/(cerium+zirconium), of 0.33 to 0.90, has an ion conductivity measured by an AC impedance method of $1 \times 10^{-5}$ S/cm or more at 400° C., and contains metal ions M of one or more types of rare earth elements selected from $Sm^{3+}$, $Eu^{3+}$, $Pr^{3+}$, $Gd^{3+}$, and $Dy^{3+}$ with a coordination number of over 7.0 in an amount of 0.5 mol % to 15 mol % with respect to the total amount of cations.

8 Claims, No Drawings

CERIA-ZIRCONIA-BASED COMPOSITE OXIDE OXYGEN STORAGE MATERIAL, EXHAUST GAS CLEANING CATALYST, AND HONEYCOMB STRUCTURE FOR EXHAUST GAS CLEANING

FIELD

The present invention relates to an oxygen storage material comprised of a ceria-zirconia-based composite oxide. In particular, it relates to an oxygen storage material with a fast oxygen storage rate and excellent purification performance suitable for a co-catalyst in an exhaust gas purification catalyst, to an exhaust gas purification catalyst, and to a honeycomb structure for exhaust gas purification.

BACKGROUND

In the past, as the method for removing harmful substances from the exhaust gas of automobiles such as carbon monoxide (CO), hydrocarbons (HC), and nitrogen oxides ($NO_x$), three-way catalysts having precious metals (for example, Pt, Rh, Pd, Ir, Ru, etc.) as catalytic ingredients have been used. In three-way catalysts, the CO and HC are oxidized and the nitrogen oxides ($NO_x$) are reduced simultaneously to purify the exhaust gas.

In a three-way catalyst used for purifying the exhaust gas of a gasoline engine, to enhance the action of the precious metal, it is preferable to keep the ratio of the fuel and air (air-fuel ratio) constant (at the stoichiometric air-fuel ratio). However, the air-fuel ratio greatly changes in accordance with acceleration, deceleration, low speed running, high speed running, and other driving conditions. For this reason, feedback control using an oxygen sensor has been employed to try to keep the air-fuel ratio A/F (air/fuel), which fluctuates depending on the engine operating conditions, constant. However, the A/F fluctuates along with time along with the feedback time, so with just engine control, it has been difficult to hold the exhaust gas composition at the stoichiometric air-fuel ratio or the vicinity of the same.

For this reason, it is necessary to finely adjust the composition at the catalyst side so as to store oxygen when the concentration of oxygen in the exhaust gas is high and to release oxygen when the concentration of oxygen in the exhaust gas is low. Ceria (cerium oxide $CeO_2$) has an oxygen storage capacity (below, sometimes simply referred to as "OSC"), so is being widely used as an oxygen storage material (co-catalyst) for adjusting the oxygen partial pressure of catalysts for purifying automotive exhaust gas. This utilizes the redox reaction of $Ce^{3+}/Ce^{4+}$. Ceria is generally used in the form of a ceria-zirconia-based composite oxide in which it forms a solid solution with zirconia (zirconium oxide $ZrO_2$) so as to enhance its property.

The ceria-zirconia-based composite oxide is generally mixed with alumina in a ratio of several percent or several tens of percent in a state where Pt, Pd, Rh, or another catalyst precious metal is supported. This mixture is coated on the surface of a honeycomb support in a wash-coat layer of a thickness of ten or so μm to several hundreds of μm (for example, 10 to 600 μm). The ceria-zirconia-based composite oxide functions as a co-catalyst assisting the action of the catalyst precious metal.

The catalyst wash-coated at the inside of the honeycomb support purifies the exhaust gas by contact with it as the gas circulates. The total length of the honeycomb support is a short one of 10 cm to about 30 cm. The time for purifying the exhaust gas is extremely short. To complete the purification in this short time, it is necessary to complete the adjustment of the oxygen partial pressure by the ceria-zirconia in an extremely short time of millisecond units.

PTL 1 has as its object to increase the specific surface area of a ceria-zirconia-based oxide and proposes a metal acetyl acetonate-surface-modified ceria-zirconia-based hydrated oxide comprised of a ceria-zirconia-based hydrated oxide with a surface modified by at least one type of acetyl acetonate selected from the group comprising La, Pr, Nd, Sm, Gd, and Y. PTL 2 proposes a zirconia-based porous body maintaining its pore size and pore volume even after treatment at a high temperature. The object of this is to keep the particle surfaces large and prevent sintering of the supported precious metal particles and to enable oxygen to be smoothly moved even after the ceria-zirconia-based composite oxide through which the oxygen moves is exposed to high temperature exhaust gas.

PTL 3 discloses development focused in the OSC amount. This is for enabling adjustment of the composition of the exhaust gas even if the composition greatly deviates from the stoichiometric air-fuel ratio or continues for a long time.

PTL 4 proposes focusing on the oxygen release rate up to 60 seconds after start of reduction. PTL 5 proposes ceria-zirconia with a large OSC amount and large release rate by combining a fluorite type structure ceria-zirconia with ceria-zirconia having a pyrochlore structure. These development efforts focusing on the rate of oxygen release from ceria-zirconia-based oxides aim at smoother movement of oxygen from the ceria-zirconia-based composite oxide particles and improved purification performance.

CITATION LIST

Patent Literature

PTL 1: Japanese Patent Publication No. 2006-256912A
PTL 2: WO2015/145787A
PTL 3: Japanese Patent Publication No. 2015-131892A
PTL 4: Japanese Patent Publication No. 2011-121851A
PTL 5: WO2012/105454A

SUMMARY

Technical Problem

In the above way, in a ceria-zirconia-based oxide used as an oxygen storage material, up until now a high OSC value and a large specific surface area for maintaining the same have been sought in catalysts for purifying automotive exhaust gas etc. Development efforts aimed at realizing with these have been aggressively pursued. However, due to tougher regulations, the increasingly complicated electronic control of engines, the increasingly complicated electronic control of fuel injection for improving fuel efficiency and improving engine performance, etc., the current ceria-zirconia-based composite oxides are not sufficient. A ceria-zirconia-based composite oxide further improving the purification performance is being sought. Specifically, a ceria-zirconia-based oxide having an OSC ability able to rapidly respond to changes in the exhaust gas of recent high performance engines, that is, exhaust gas which almost never greatly deviates from the stoichiometric air-fuel ratio since the feedback time is short, but finely varies to the rich/lean sides of the stoichiometric air-fuel ratio, has been sought.

Therefore, an object of the present invention is to provide a ceria-zirconia-based composite oxide oxygen storage material with a fast oxygen storage rate having an OSC ability enabling fast response to changes in the exhaust gas, which never greatly fluctuates in composition, but varies at a high speed near the stoichiometric air-fuel ratio. Further, it is to provide an exhaust gas purification catalyst using that ceria-zirconia-based composite oxide oxygen storage material and provide a honeycomb structure for exhaust gas purification.

Solution to Problem

The inventors engaged in in-depth research to solve the above problem and obtained the following findings:
They discovered that an oxygen storage material with
(a) a molar ratio of cerium and zirconium (cerium/(cerium+zirconium)) of 0.33 to 0.90,
(b) an ion conductivity measured by the AC impedance method of $1 \times 10^{-5}$ S/cm or more at 400° C., and
(c) a content of metal ions M of a rare earth element with a coordination number over 7.0 of 0.5 mol % to 15 mol % with respect to the total amount of cations
forms a ceria-zirconia-based composite oxide with a remarkably fast oxygen storage rate even in a region with a low oxygen partial pressure. In particular, they discovered that the $NO_X$ cleaning ability is enhanced and thereby completed the present invention.

That is, the gist of the present invention is as follows.
(1) A ceria-zirconia-based composite oxide oxygen storage material, which oxygen storage material has a molar ratio of cerium and zirconium, by cerium/(cerium+zirconium), of 0.33 to 0.90, has an ion conductivity measured by an AC impedance method of $1 \times 10^{-5}$ S/cm or more at 400° C., and contains metal ions M of a rare earth element with a coordination number of over 7.0 in an amount of 0.5 mol % to 15 mol % with respect to the total amount of cations.
(2) The oxygen storage material according to (1), wherein the metal ions M are one or more types selected from $Sm^{3+}$, $Eu^{3+}$, $Pr^{3+}$, $Gd^{3+}$, and $Dy^{3+}$.
(3) The oxygen storage material according to (1) or (2), wherein an oxygen storage capacity amount (OSC amount) is 300 μmol-$O_2$/g or more.
(4) The oxygen storage material according to any one of (1) to (3), containing the metal ions M in an amount of 2 mol % to 6 mol % with respect to the total amount of cations.
(5) The oxygen storage material according to any one of (1) to (4), wherein the ceria-zirconia-based composite oxide oxygen storage material contains metal ions having ion radii larger than $Ce^{4+}$ ions.
(6) An exhaust gas purification catalyst comprising an oxygen storage material according to any one of (1) to (5) supporting a precious metal.
(7) A honeycomb structure for exhaust gas purification comprised of an exhaust gas purification catalyst according to (6) covering an inside wall of a metal or ceramic honeycomb.

Advantageous Effects of Invention

If in the above way using an oxygen storage material comprised of a ceria-zirconia-based composite oxide having an OSC ability able to quickly respond to changes in the exhaust gas, which never greatly fluctuates in composition, but which varies at a high speed near the stoichiometric air-fuel ratio, according to the present invention for an catalyst for purification of automotive exhaust gas, it is possible to adjust the composition of the exhaust gas as it changes with each instant in accordance with the driving conditions and possible to improve the performance of the precious metal in removing harmful components more than in the past. In particular, the ability to removing $NO_X$ is enhanced.

DESCRIPTION OF EMBODIMENTS

In the ceria-zirconia-based composite oxide of the present invention, the material with a fast oxygen storage capacity rate (sometimes referred to as the "OSC rate") has a high OSC rate specifically in a region with a low oxygen partial pressure. For this reason, if using this for a catalyst for purification of automotive exhaust gas, it is possible to assist purification of exhaust gas as it changes in each instant in accordance with the driving conditions.

The oxygen storage material of the ceria-zirconia-based composite oxide of the present invention is an oxygen storage material of a ceria-zirconia-based composite oxide which has a molar ratio of cerium and zirconium, by cerium/(cerium+zirconium), of 0.33 to 0.90, has an ion conductivity measured by an AC impedance method of $1 \times 10^{-5}$ S/cm or more at 400° C., and contains metal ions M of a rare earth element with a coordination number of over 7.0 in an amount of 0.5 mol % to 15 mol % with respect to the total amount of cations. In particular, if the metal ions M are one type or more selected from $Sm^{3+}$, $Eu^{3+}$, $Pr^{3+}$, $Gd^{3+}$, and $Dy^{3+}$, the OSC rate becomes larger specifically in a region with a low oxygen partial pressure.

The reason why the OSC rate is improved in a region with a low oxygen partial pressure has not been completely clarified. It is guessed that by making the ion conductivity $1 \times 10^{-5}$ S/cm or more at 400° C., the internal resistance of the ceria-zirconia-based composite oxide particles falls and the speed of movement of $O^{2-}$ ions becomes greater. Furthermore, it is guessed that by mixing in metal ions M of a rare earth element with a coordination number over 7.0 in 0.5 mol % to 15 mol % with respect to the total amount of cations, preferably 1 mol % to 12 mol % with respect to the total amount of cations, more preferably 2 mol % to 6 mol % with respect to the total amount of cations, still more preferably 3 mol % to 5 mol % with respect to the total amount of cations, the symmetry of the ceria-zirconia-based composite oxide crystals is improved and the paths of conduction of the $O^{2-}$ ions become straighter, whereby the average distance of movement until the particle surfaces becomes shorter.

Further, if metal ions M of a rare earth element with a coordination number of over 7.0 are included in the above specific amounts, the OSC response becomes excellent. That is, the OSC rate becomes faster. This means that by inclusion of metal ions M of a rare earth element, oxygen vacancies $V_{O^{2-}}$ which are formed tend to be resistant to localization around the metal ions M and tend to be widely distributed. That is, if the coordination number of the metal ions M is 7.0 or less, the oxygen vacancies all become localized around metal ions M. If the coordination number is over 7.0, there will be oxygen vacancies other than around the metal ions M. In this way, having the oxygen vacancies widely distributed in the ceria-zirconia rather than being localized enables the paths of conduction of the $O^{2-}$ ions to be made straighter and enables the OSC rate to be raised. Therefore, the present invention is limited to metal ions M of a rare earth element with a coordination number of over 7.0.

The coordination number of metal ions M of a rare earth element in the present invention is the average coordination number of metal ions M found by extended X-ray absorption fine structures (EXAFS) and is determined as follows:

The coordination number of metal ions M is found from the peak due to the first neighbor (nearest neighbor) atoms in a Fourier transform of the EXAFS spectrum of the absorption end of the metal ions M.

Note that, if the molar ratio of the cerium and zirconium (cerium/(cerium+zirconium)) is less than 0.33, the number of cerium ions actually storing oxygen on the surfaces of the ceria-zirconia-based composite oxide particles becomes too small. On the other hand, if the molar ratio of the cerium and zirconium exceeds 0.90, structural stability cannot be maintained, so a fast OSC rate cannot be realized.

Further, if the amount of metal ions M of the rare earth element with a coordination number of over 7.0 is less than 0.5 mol %, the above advantageous effect cannot be obtained. On the other hand, if the amount of metal ions M of the rare earth element with a coordination number of over 7.0 is over 15 mol %, the amount of Ce actually storing oxygen decreases and the effect falls. Therefore, the amount of metal ions M of the rare earth element with a coordination number of over 7.0 was made 15 mol % or less. Furthermore, even if including metal ions M of a rare earth element with a coordination number of over 7.0 in a ceria-zirconia-based composite oxide with an ion conductivity of less than $1 \times 10^{-5}$ S/cm at 400° C., the total speed of movement of oxygen falls and the purification performance is not sufficiently improved. Note that, the higher the ion conductivity, the better. The upper limit is not particularly set, but $1 \times 10^{-2}$ S/cm at 400° C. is realistic as an upper limit.

The ceria-zirconia-based composite oxide of the present invention preferably has part of the cerium or zirconium substituted by metal ions having ion radii greater than $Ce^{4+}$ ions, that is, metal ions having valences of less than 4 (for example, Ca, Sc, Sr, Y, Ba, La, Pr, Nd, Sm, Pr, Yb, etc.) since such a ceria-zirconia-based composite oxide is improved in OSC rate. In particular, as substituting metal elements where an effect of improvement of the OSC rate is seen, Sc, Y, La, Nd, Pr, etc. may be mentioned. The amount substituted is not particularly limited, but is preferably 20 mol % or less with respect to the total cations of the ceria-zirconia-based oxide. To obtain the effect of substitution more, the amount is 3 mol % to 20 mol %, more preferably 3 mol % to 15 mol %.

The OSC amount of the ceria-zirconia-based oxide of the present invention is not particularly limited with the current mode of evaluation. In preparation for further toughening of exhaust gas controls, the OSC amount is preferably 300 µmol-$O_2$/g or more. The greater the OSC amount, the better. The upper limit is not particularly set, but 420 µmol-$O_2$/g or so is realistic as an upper limit.

Further, the oxygen storage material comprised of the ceria-zirconia-based composite oxide of the present invention can be made to support a precious metal so as to use it as an exhaust gas purification catalyst.

Further, the honeycomb structure for exhaust gas purification is formed by mixing alumina into the above exhaust gas purification catalyst by an ordinary method in a ratio of several percent to several tens of percent so as to cover the inside walls of the metal or ceramic honeycomb to a thickness of ten or so µm to several hundred µm.

The "OSC rate" referred to in the present invention is measured as follows: Using a catalyst analyzer BELCAT2 made by MicrotracBel, 10 mg of a sample powder was raised in temperature to 400° C. under a flow of 100% $O_2$ gas, then was held for 15 minutes (pretreatment). After that, the gas was switched to 100% He gas which was run for 15 minutes, then 1% CO/He was injected by pulses of 1 cm³. The CO pulse conversion rate was calculated from the amount of decrease of the CO gas. Samples with a conversion rate of over 70% were judged to be fast in OSC rate. The reason why the OSC rate can be judged by the conversion rate in this measurement was as follows: The CO gas injected under the above conditions is ¹/₁₀ or less of the amount of CO gas necessary in the case of a complete reaction of $2CO+O_2 \rightarrow 2CO_2$ with the available $O_2$ projected from the OSC amount of the ceria-zirconia-based composite oxide. Further, even compared with the case where the concentration of CO gas generally used in the CO pulse method is about 10%, the concentration is ¹/₁₀. In this way, a ceria-zirconia-based composite oxide having the ability to store oxygen even in an atmosphere just slightly off from the stoichiometric air-fuel ratio if made to react by such a low amount and low concentration of CO gas has a conversion rate of over 70%. However, one not having such an ability has a conversion rate of 70% or less even if the OSC amount is high. By doing this, it is possible to evaluate the performance at the time of catalyst use. A ceria-zirconia-based composite oxide with a conversion rate of 70% or more measured by the above CO pulse method has an OSC able to quickly respond to fine variation of the composition to the rich/lean side from the stoichiometric air-fuel ratio and can improve the performance of a precious metal in removing harmful components.

EXAMPLES

Below, invention examples and comparative examples will be used to concretely explain the present invention, but the present invention is not limited to these.

The ion conductivity is measured as follows: A sample (ceria-zirconia-based composite oxide) is fired at 1200° C. and then pulverized by a wet ball mill. As a binder, PVA is added to the sample in an amount of 1 mass %. 1 ton/m² of pressure is applied to shape the sample into a flat plate. After that, this is sintered at 1450° C. Four parallel platinum electrodes are bonded to the flat plate sample in the long side directions together with platinum wires by platinum paste so as to surround the sample and thereby fabricate electrodes. The sample with the platinum electrodes was measured for high temperature conduction by the AC four-terminal method. An Impedance Analyzer HP4192 (made by Agilent) was used to measure the complex resistivity from 1 Hz to 10 MHz. The conductivity of the sample was found from the bulk resistance part able to be determined from a Cole-Cole plot of the real and imaginary parts of the resistivity. The series of measurements were performed after heating by an electrical furnace to 400° C.

The coordination number of the metal ions M of the rare earth element was measured by the above-mentioned measurement method. Synchrotron radiation X-rays were utilized to obtain an X-ray absorption spectrum by the usual XAFS analysis method for example, (see "X-Ray Absorbing Microstructures" (Yasuo Udagawa ed., Gakkai Shuppan Center)). The coordination number was found from the first neighbor peak in a Fourier transform of the EXAFS spectrum.

The OSC rate is measured by the above-mentioned measurement method, while the OSC amount is measured as follows: An aluminum pan was packed with the sample (ceria-zirconia-based composite oxide) to about 10 mg and was set in a thermal gravimetric analyzer. The sample was treated in a 5% $H_2$/Ar stream at 400° C. for 1 hour to reduce it. After that, 100% $O_2$ was run at 400° C. for 10 minutes to oxidize the sample. The change in weight before and after the oxidation treatment was calculated as the OSC amount of the sample.

Invention Example 1

Preparation of Ceria-Zirconia Composite Oxide

A cerium chloride solution, zirconium oxychloride solution, praseodymium chloride solution, gadolinium chloride solution, and pure water were mixed to obtain 1 L (liter) of a solution with a cation ratio of Ce:Zr:Y:Gd=42:45:10:3, 0.5 mol/L. To the obtained mixture, 15 g of ammonium peroxodisulfate was added. While stirring, this was heated to 95° C. to obtain a cerium-zirconium composite sulfate. The obtained sulfate slurry was cooled down to 60° C., then ammonia water was added to neutralize it and obtain a slurry containing hydroxides. The obtained hydroxide slurry was filtered and washed repeatedly four times to obtain a cerium-zirconium composite hydroxide cake. The obtained composite hydroxide cake was dried at 120° C. to obtain a composite hydroxide powder. This was packed into a crucible and fired in an electric furnace at 700° C. for 3 hours to obtain a ceria-zirconia-based composite oxide powder. The obtained powder was sintered by the above-mentioned method. Electrodes were attached and the ion conductivity was measured. Furthermore, the obtained powder was impregnated with Pd to support it in a ratio of 0.5 mass % and was measured for OSC amount and CO pulse conversion rate, whereupon the results were obtained of an ion conductivity of $6.30\times10^{-5}$ (below, indicated as 6.30E-0.5) $S\cdot cm^{-1}$, an OSC amount of 333 $\mu mol$-$O_2$/g, and a CO pulse conversion rate of 95%.

Invention Examples 2 to 12 and Comparative Examples 1 to 3

In each of Invention Examples 2 to 12 and Comparative Examples 1 to 3, the same procedure was performed as in Invention Example 1 to obtain a cerium-zirconium composite hydroxide cake with a predetermined ratio of components described in Table 1. This was packed into a crucible and fired in an electric furnace at 700° C. for 3 hours to obtain a ceria-zirconia-based composite oxide powder. Further, the obtained powder was measured for ion conductivity and measured for OSC amount and CO pulse conversion rate in the same way as Invention Example 1. The measurement results are shown in Table 1.

The compositions in Table 1 are charged cation ratios (oxygen ratio is reference value). It is confirmed that the ratios are similar even if analyzing the cation ratios of the prepared ceria-zirconia-based composite oxide powders.

TABLE 1

| | No. | Composition | Molar ratio Ce/(Ce + Zr) | Metal ions M over 7.0 (mol %) | Ion conductivity $\sigma(S\cdot cm^{-1})$ | OSC amount ($\mu mol$-$O^2$/g) | CO pulse conversion rate (%) |
|---|---|---|---|---|---|---|---|
| Inv. ex. | 1 | $Ce_{0.42}Zr_{0.45}Y_{0.10}Gd_{0.03}O_{1.935}$ | 0.48 | 3 | 6.30E−05 | 333 | 95 |
| | 2 | $Ce_{0.30}Zr_{0.58}Y_{0.06}Gd_{0.06}O_{1.94}$ | 0.34 | 6 | 1.33E−03 | 300 | 92 |
| | 3 | $Ce_{0.68}Zr_{0.20}Y_{0.02}Gd_{0.10}O_{1.94}$ | 0.77 | 10 | 1.07E−05 | 368 | 91 |
| | 4 | $Ce_{0.32}Zr_{0.56}Y_{0.02}La_{0.08}Sm_{0.02}O_{1.94}$ | 0.36 | 2 | 6.80E−04 | 310 | 97 |
| | 5 | $Ce_{0.40}Zr_{0.46}Y_{0.05}La_{0.03}Eu_{0.06}O_{1.93}$ | 0.47 | 6 | 7.43E−05 | 324 | 98 |
| | 6 | $Ce_{0.45}Zr_{0.31}Y_{0.08}La_{0.06}Gd_{0.10}O_{1.88}$ | 0.59 | 10 | 8.31E−05 | 328 | 91 |
| | 7 | $Ce_{0.75}Zr_{0.18}Pr_{0.05}Sm_{0.01}Eu_{0.01}O_{1.965}$ | 0.81 | 7 | 9.41E−05 | 380 | 77 |
| | 8 | $Ce_{0.50}Zr_{0.36}Pr_{0.08}Sm_{0.03}Gd_{0.03}O_{1.94}$ | 0.58 | 14 | 8.31E−05 | 328 | 86 |
| | 9 | $Ce_{0.65}Zr_{0.23}Gd_{0.12}O_{1.94}$ | 0.74 | 12 | 2.41E−05 | 410 | 75 |
| | 10 | $Ce_{0.30}Zr_{0.58}Y_{0.04}Dy_{0.08}O_{1.94}$ | 0.34 | 8 | 1.44E−05 | 310 | 85 |
| | 11 | $Ce_{0.30}Zr_{0.58}Pr_{0.06}Dy_{0.08}O_{1.34}$ | 0.34 | 14 | 1.35E−05 | 300 | 83 |
| | 12 | $Ce_{0.30}Zr_{0.58}La_{0.02}Dy_{0.1}O_{1.94}$ | 0.34 | 10 | 1.20E−05 | 290 | 81 |
| Co. ex. | 1 | $Ce_{0.42}Zr_{0.45}Y_{0.10}La_{0.03}O_{1.935}$ | 0.48 | 0 | 5.06E−05 | 283 | 60 |
| | 2 | $Ce_{0.30}Zr_{0.58}La_{0.12}O_{1.94}$ | 0.34 | 0 | 6.45E−04 | 287 | 58 |
| | 3 | $Ce_{0.68}Zr_{0.32}O_2$ | 0.68 | 0 | 1.41E−06 | 292 | 35 |

The OSC rates of the ceria-zirconia-based composite oxides containing predetermined amounts of metal ions M of rare earth elements with coordination numbers over 7.0 obtained in Invention Examples 1 to 12 in Table 1 were large. Among them, in particular, ceria-zirconia-based composite oxides containing predetermined amounts of Gd, Sm, Eu, Pr, and Dy were all oxygen storage materials with CO pulse conversion rates, which are indicators of the OSC rate, of 70% or more and exhibited remarkably better OSC performance than Comparative Examples 1 to 3.

Table 2 shows the average coordination numbers of metal ions M of rare earth elements found from extended X-ray absorption fine structures (EXAFS).

TABLE 2

| | No. | Element | Coordination no. | Element | Coordination no. | Element | Coordination no. |
|---|---|---|---|---|---|---|---|
| Inv. ex. | 1 | Y | 7.0 | Gd | 7.1 | — | — |
| | 2 | Y | 7.0 | Gd | 7.1 | — | — |
| | 3 | Y | 7.0 | La | 6.9 | Sm | 7.2 |
| | 4 | Y | 7.0 | La | 6.9 | Eu | 7.1 |
| | 5 | Y | 7.0 | La | 6.9 | Gd | 7.1 |
| | 6 | Y | 7.0 | La | 6.9 | Eu | 7.1 |
| | 7 | Pr | 7.1 | Sm | 7.2 | Eu | 7.1 |
| | 8 | Pr | 7.1 | Sm | 7.2 | Gd | 7.1 |
| | 9 | Gd | 7.1 | — | — | — | — |
| | 10 | Y | 7.0 | Dy | 7.1 | — | — |
| | 11 | Pr | 7.1 | Dy | 7.1 | — | — |
| | 12 | La | 6.9 | Dy | 7.1 | — | — |
| Co. ex. | 1 | Y | 7.0 | La | 6.9 | — | — |
| | 2 | La | 6.9 | — | — | — | — |
| | 3 | No added metal ions — | | — | — | — | — |

As explained above, according to the present invention, it was confirmed that a ceria-zirconia-based composite oxide improved in purification performance is obtained when using it as a co-catalyst of a catalyst for purification of automotive exhaust gas.

INDUSTRIAL APPLICABILITY

The material with the fast oxygen storage rate of the present invention can be used as the co-catalyst of a catalyst for purification of automotive exhaust gas. According to this, it is possible to assist the purification of the exhaust gas of recent high performance engines, that is, exhaust gas which almost never greatly deviates from the stoichiometric air-fuel ratio, but which finely varies to the rich/lean sides from the stoichiometric air-fuel ratio. It improves the performance of precious metals in removing harmful components more than in the past.

The invention claimed is:

1. A ceria-zirconia-based composite oxide oxygen storage material, which oxygen storage material has a molar ratio of cerium and zirconium, by cerium/(cerium+zirconium), of 0.33 to 0.90, has an ion conductivity measured by an AC impedance method of $1 \times 10^{-5}$ S/cm or more at 400° C., and contains metal ions M of a rare earth element with an oxygen coordination number of over 7.0 in an amount of 0.5 mol % to 15 mol % with respect to a total amount of cations, wherein said metal ions M are one or more types selected from $Sm^{3+}$, $Eu^{3+}$, $Gd^{3+}$, and $Dy^{3+}$; wherein said cations comprise ions of Ce, Zr and at least one of Ca, Sc, Sr, Y, Ba, La, Pr, Nd, Sm, Pr, Yb, Eu, Gd and Dy;
wherein an oxygen storage capacity amount (OSC amount) is 300 µmol-$O_2$/g or more; and wherein a conversion rate measured by a CO pulse method is 70% or more.

2. The oxygen storage material according to claim 1, containing said metal ions M in an amount of 2 mol % to 6 mol % with respect to the total amount of cations.

3. The oxygen storage material according to claim 1, wherein said ceria-zirconia-based composite oxide contains metal ions having ion radii larger than $Ce^{4+}$ ions.

4. An exhaust gas purification catalyst comprising an oxygen storage material according to claim 1 supporting a precious metal.

5. A honeycomb structure for exhaust gas purification comprised of an exhaust gas purification catalyst according to claim 4 covering an inside wall of a metal or ceramic honeycomb.

6. The oxygen storage material according to claim 2, wherein said ceria-zirconia-based composite oxide contains metal ions having ion radii larger than $Ce^{4+}$ ions.

7. An exhaust gas purification catalyst comprising an oxygen storage material according to claim 2 supporting a precious metal.

8. An exhaust gas purification catalyst comprising an oxygen storage material according to claim 3 supporting a precious metal.

* * * * *